US012354434B2

(12) United States Patent
Setiowaty

(10) Patent No.: US 12,354,434 B2
(45) Date of Patent: Jul. 8, 2025

(54) STRING HANDLER AND METHOD FOR HANDLING STRINGS USEABLE FOR GAMES

(71) Applicant: Johannes Hendro Yuniko Setiowaty, Sprundel (NL)

(72) Inventor: Johannes Hendro Yuniko Setiowaty, Sprundel (NL)

(*) Notice: Subject to any disclaimer, the term of this patent is extended or adjusted under 35 U.S.C. 154(b) by 334 days.

(21) Appl. No.: 18/042,216

(22) PCT Filed: Aug. 17, 2021

(86) PCT No.: PCT/NL2021/050511
§ 371 (c)(1),
(2) Date: Feb. 19, 2023

(87) PCT Pub. No.: WO2022/039595
PCT Pub. Date: Feb. 24, 2022

(65) Prior Publication Data
US 2023/0298430 A1 Sep. 21, 2023

(30) Foreign Application Priority Data
Aug. 20, 2020 (NL) ...................................... 2026302

(51) Int. Cl.
*G07F 17/00* (2006.01)
*G07F 17/32* (2006.01)

(52) U.S. Cl.
CPC ...... *G07F 17/3223* (2013.01); *G07F 17/3237* (2013.01); *G07F 17/3244* (2013.01); *G07F 17/3288* (2013.01); *G07F 17/3295* (2013.01)

(58) Field of Classification Search
None
See application file for complete search history.

(56) References Cited

U.S. PATENT DOCUMENTS 4,438,932 A * 3/1984 Finkel .................. A63F 3/0423 273/237
4,760,528 A * 7/1988 Levin .................... G06F 40/274 400/98

(Continued)

FOREIGN PATENT DOCUMENTS

| | | | |
|---|---|---|---|
| GB | 2 530 346 | A | 3/2016 |
| WO | WO 03/023647 | A1 | 3/2003 |
| WO | WO 2006/023298 | A2 | 3/2006 |

*Primary Examiner* — Paul A D'Agostino
(74) *Attorney, Agent, or Firm* — NEXUS LAW PLLC; Leonard Raykinsteen

(57) ABSTRACT

Word games are known from for example Scrabble®. Roulette is another game having a high level of randomness to it. A disadvantage of the current games involving randomness, more specific a lot of randomness, is that the word skills of players with a strategy insight is not challenged very well. According to the invention, a string handler comprising: a random character generator for generating a random character randomly selected from a set of characters; a memory arranged for storing a string of characters selected from the set of characters, wherein the string has a minimum length of three characters, and marks associated with each character of the string; an input device for inputting at least one activation tag associated with at least one character of the string; an output device for conveying an indication to the user; a controller configured for: retrieving from the memory the string and when present the marks; receiving from the input device at least one activation tag; after receiving the at least one activation tag, receiving from the random character generator the random character; after receiving the random character, associating a mark with each character in the string if the character equals the random character, and if an activation tag was associated with the character in the string; after associating and if all characters in the string are associated with a mark, providing (Continued)

an indication to the output device and resetting the string; and after the preceding step, storing in memory the string and when present one or more marks.

16 Claims, 3 Drawing Sheets

(56) References Cited

U.S. PATENT DOCUMENTS

| | | | | | |
|---|---|---|---|---|---|
| 4,891,775 | A * | 1/1990 | McWherter | A63F 3/00643 | 434/169 |
| 5,056,798 | A * | 10/1991 | Wehrley | A63F 9/24 | 273/460 |
| 5,203,705 | A * | 4/1993 | Hardy | G06F 40/247 | 434/167 |
| 5,435,564 | A * | 7/1995 | Kennedy | A63F 3/0421 | 273/272 |
| 5,544,891 | A * | 8/1996 | Gibson | A63F 3/0478 | 273/440 |
| 5,586,765 | A * | 12/1996 | Lackey | A63F 3/0423 | 273/299 |
| 5,860,653 | A * | 1/1999 | Jacobs | G06Q 10/107 | 273/272 |
| 5,921,864 | A * | 7/1999 | Walker | A63F 3/0421 | 273/272 |
| 6,283,476 | B1 * | 9/2001 | Henry | A63F 9/0098 | 273/459 |
| 6,367,798 | B1 * | 4/2002 | Lawal | A63F 9/0413 | 273/272 |
| 6,368,214 | B1 * | 4/2002 | Luciano | A63F 1/00 | 463/19 |
| 6,454,262 | B1 * | 9/2002 | Wilt | A63F 3/0423 | 273/272 |
| 6,585,585 | B1 * | 7/2003 | Fletcher | A63F 3/0421 | 463/9 |
| 6,650,952 | B1 * | 11/2003 | Garcia | A63F 13/80 | 463/43 |
| 6,775,663 | B1 * | 8/2004 | Kim | G06F 16/3335 | 707/E17.096 |
| 6,895,238 | B2 * | 5/2005 | Newell | A63F 13/46 | 455/457 |
| 7,027,037 | B2 * | 4/2006 | Dowd | H01H 9/182 | 345/170 |
| 7,334,793 | B2 * | 2/2008 | Hurwitz | A63F 3/0423 | 273/299 |
| 7,766,739 | B2 * | 8/2010 | Kane | G07F 17/32 | 463/16 |
| 7,972,205 | B2 * | 7/2011 | Krishna | A63F 13/12 | 273/272 |
| 8,251,367 | B2 * | 8/2012 | Yu | A63F 3/00643 | 273/272 |
| 8,308,539 | B1 * | 11/2012 | Cleghorn | A63F 3/0423 | 434/167 |
| 9,415,302 | B2 * | 8/2016 | Beppu | H04N 21/812 | |
| 10,173,139 | B2 * | 1/2019 | Decoufle | A63F 13/87 | |
| 10,303,746 | B1 * | 5/2019 | Periasamy | B60R 13/10 | |
| 10,610,768 | B2 * | 4/2020 | Starr | A63F 3/0423 | |
| 2006/0160618 | A1 * | 7/2006 | Kogo | G09B 13/04 | 463/36 |
| 2007/0235935 | A1 * | 10/2007 | Vien | A63F 3/00 | 273/272 |
| 2021/0027608 | A1 * | 1/2021 | Shakedd | G08B 21/24 | |

* cited by examiner

STRING HANDLER AND METHOD FOR HANDLING STRINGS USEABLE FOR GAMES

FIELD OF THE INVENTION

The invention relates to the field of random character generators and strings used in games.

BACKGROUND OF THE INVENTION

Word games are known from for example Scrabble®. In Scrabble multiple players take turns by forming words on a game board with playing stones from its letter rack. Other types of games involve a combination of skill or strategy, and randomness. As an example, the Ludo® board game. Ludo requires multiple players to move tokens over a game track to a safe zone. Roulette is another game having a high level of randomness to it. A player playing roulette is not challenged very much on the strategic level.

U.S. Pat. No. 5,056,798 discloses an electronic hand-held game apparatus comprising a portable hand-held type computer including a keyboard, display screen, and memory. The keyboard has a plurality of data entry keys and instruction keys. The data entry keys include twenty-six alphabetic and ten numeric characters arranged in a novel manner. In play mode, the microprocessor which controls the data flow between the memory, data entry keys, function keys, and the display, accepts sets of data entered into the keyboard by the player. The sets of data comprise combinations of alphanumeric characters corresponding to license plates observed by the player. The microprocessor compares the license plate data to the stored thirty-six character data to identify and accumulate matches between them. Once all thirty-six characters have been matched, a winning signal is provided. The game is designed so that it may be played with as many players as have the apparatus. Each player takes a turn entering license plate numbers in their own instrument. The first player to have matches for all thirty-six alphanumeric characters is the winner. The instrument provides a win indicator signal.

A disadvantage of the current games dominated by randomness is that the word skills of players having a strategy insight is not challenged very well. A further disadvantage of the current games is that the efficiency and/or playing speed is not particularly high. A further disadvantage of the current games is that the games have limited playing options.

SUMMARY OF THE INVENTION

An object of the invention is to mitigate one or more of the disadvantages as mentioned above.

According to a first aspect of the invention, string handler comprising:

- a random character generator for generating a random character randomly selected from a set of characters;
- a memory arranged for storing a string of characters selected from the set of characters, wherein the string has a minimum length of three characters, and marks associated with each character of the string;
- an input device for inputting at least one activation tag associated with at least one character of the string;
- an output device for conveying an indication to the user;
- a controller configured for:
  - retrieving from the memory the string and when present the marks;
  - receiving from the input device at least one activation tag;
  - after receiving the at least one activation tag, receiving from the random character generator the random character;
  - after receiving the random character, associating a mark with each character in the string if the character equals the random character, and if an activation tag was associated with the character in the string;
  - after associating and if all characters in the string are associated with a mark, providing an indication to the output device and resetting the string; and
  - after the preceding step, storing in memory the string and when present one or more marks.

The random character generator is arranged for generating a random character randomly selected from the set of characters. The random character generator typically generates each character from the set of characters with the same chance. Uneven chance distributions are foreseen although typically not applied.

The memory arranged for storing a string of characters selected from the set of characters may be a section of a processor memory. Alternatively, the memory may be one or more registers associated with the processor. The stored string is of a minimum length of at least three characters. Furthermore, marks may be associated with characters. These marks are stored with the characters in the memory.

The output device typically may show the string. The output device typically may also show the marks if any. Further, the output device, if marks are shown, may also show the association between the mark and the associated character. The string may be shown as a row, column, curve, or diagonal of characters. Alternative ways of showing the string of characters are foreseen. The mark may be shown e.g. as a box around the associated character. Alternatively, an underscore of the character and/or blinking of the character.

The input device may comprise a touchscreen integrated with a display of the output device. The input device may comprise a keyboard arranged next to the output device, such as a display. The input device may be limited to inputting one or more activation tags associated with at least a character of the string. The input device may be limited to inputting activation tags per character of the string.

The controller may be a processor, such as a microprocessor. The controller may be associated with memory or have integrated memory. The controller may comprise registers. The controller may be arranged for executing steps. The steps may be executed consecutive or any other order. Further, one or more of the steps may be executed in parallel and/or multiple times even relative to other steps.

The step of retrieving from the memory the string and when present the marks may be executed ahead of time or just in time before the step using this information. The step of receiving from the input device activation tags may also be performed ahead of time or just in time before the step of receiving the random number.

The step of receiving from the random character generator the random character may always be executed, but is only taken into account if receiving the at least one activation tag is executed and concluded beforehand. Thus, receiving random characters by the controller may constantly occur, but only for the step mentioned for the controller, the random character is taken into account that is received after the reception of the at least one activation tag.

The step of associating a mark with each character in the string is bound to two requirements. The first being that the random character equals the character in the string. The second being that an activation tag was received for that character in the string. Additional requirements may be imposed or added depending on the setup or setting or initialization of the string handler. An activation tag associated with that character may be seen as selecting that character for being processed.

The step of providing an indication to the user output device and resetting the string is restricted to the status that all characters in the string are associated with a mark. The indication is provided to the output device. The output device may comprise for example a sound device, such as a loudspeaker, and/or a light device, such as a flashing light, beacon and/or revolving lamp. The output device may comprise for example a screen showing the indication e.g. a flashing background to and/or a flashing box around the string. Further, if the indication is given, resetting the string may comprise disassociating all marks with the characters of the string.

The step of storing in memory the string and when present one or more marks, which are associated with a character of the string, is performed after the preceding step, should be interpreted that the step is performed after the step of providing an indication if the requirements for this step are fulfilled, but if not, the preceding step is the step of associating a mark with each character in the string. Effectively, this step may be seen as overwriting the old status of the string and associated marks with the current status of the string and the associated marks. Therefore, the storing may be seen as temporarily storing in a memory close to the controller or processor, such as a DRAM or the like, or may be seen as more permanently storing in a memory typically arranged further away from the processor, such as a flash memory, solid state memory, hard drive or even a tape storage or DVD.

The string handler provides the core for intriguing interaction between a user and the string handler taking the random character generator and user input. The user may use skill and intelligence to outwit the string handler to get fast to a string with marks associated with all characters in a shortest amount of turns or repetition cycles of the controller, wherein a cycle or turn at least comprises the step of associating a mark. The technical effect is that the string handler provides an increase of options to the user thereby challenging the user. The string handler therefore provides a solid and/or compact game engine providing numerous playing options. The advantage is that the string handler may be used online as well as offline. The technical effect of associating marks in combination with storing and retrieving these marks in and from memory is that multiple cycles or turns are linked such that the game engine provides a game that is playable over a prolonged amount of time.

In an embodiment of the string handler,

- the input device is also arranged for inputting the string; and
- the controller is also configured for:
  - receiving the inputted string from the input device;
  - verifying that the inputted string comprises at least three characters;
  - searching the string in a searchable database of strings, and if found providing a found indicator; and
  - if a found indicator is provided, storing the inputted string without any marks in the memory. The input device is arranged for inputting the string, and the controller is arranged for handling this inputted string. A user may therefore advantageously use the same input device for starting up the string handler as well as during that the game is played. The combination may increase efficiency of the user, such as the player, as the user does not have to go to another station, therefore the combination may shorten the time between inputting a new string and the cycles or turns. Further, the searching of the string in a searchable database provides the additional challenge to the user to select a cunning string hopefully outwitting the odds of the string handler. The user may have prior knowledge of the searchable database to be able to better select an appropriate string. Also, the string may be a combination of entries or strings found in the searchable database. Typically, the combination of entries or strings may be separated in the string by an entry separator, such as a space, comma, tab and/or carriage return. Part of the string separated by an entry separator may be displayed by the output device as separate lines on a display, e.g. as rows above each other on the display. An example of a string separated by entry separators may be “casino pays for our vacation”. Typically, the entry separator is not taken into account when evaluating the string, thus the entry separator is ignored when by the string handler. More specific, the entry separator is not taken into account at least when the controller executes the steps of associating a mark, and providing an indication.

In an embodiment of the string handler, the searchable database is based on a dictionary, preferably of one particular language, advantageously providing an easy implementation. Further, by basing the searchable database on a particular dictionary or combination of dictionaries, the string handler may be arranged for use in a specific country, a specific region and/or a specific selection of countries. Further, the searchable database may be focused on specific dialects, crowds, tribes, nations or people.

In an embodiment of the string handler, the searchable database is accessible through an Internet search engine, such as Google, Bing, Yahoo!. These search engines may be used to decide if the string should be accepted as valid. A possible selection criterion could be if the search engine returns with an alternative or corrected spelling. A possible selection criterion could be if the number of search results exceeds a particular threshold value. Another possible selection criterion could be if the images returned by the search engine show a particular item or object. The use of one or more Internet search engines provides efficient checking of the string.

In an embodiment of the string handler, the string handler comprises:

- a bank account access unit for deducting amounts from a bank account of the user; and
- wherein the output device is also configured for showing a to be deducted amount from the bank account;
- wherein the input device is also configured for inputting a base value;
- wherein the memory is also arranged for storing a character value for each character of the set of characters based on a frequency analyses of the characters forming strings in the searchable database; and
- wherein the controller is also configured for:
  - receiving the base value from the input device;
  - after receiving the activation tags, calculating a to be deducted amount based on aggregation for each individual character in the string associated with a tag, based on the character value and the base value; and providing the to be deducted amount to the bank account access unit. Coupling the bank account via a bank account access unit directly to the string handler provides an efficient way of playing preventing that the user or player has to go to a separate central register, pay box, pay booth or counter, thus saving time for the user, but also allowing the string handler to be used more intensive or more efficient. Furthermore, the string handler is simplified as a separate input device for receiving coins or the like is prevented. Further, the personal details of the user may be checked via the used bank account allowing to comply to local regulations of knowing your customer in an efficient way.

In an embodiment of the string handler, the aggregation is based on multiplying the character value with the base value for each character, whereafter these values per character are added or multiplied providing a logical and easy to follow for the user calculation method. Typically, the odds that all characters of the string have associated marks, thus satisfy the requirements for the indication step, is lowered, but the indication may therefore be multiplied or increased. As an example, the indication may be a payment of an amount of money to the bank account of the user, wherein the amount is increased if the odds are lower. It is the challenge to the user to strike a favourable balance between lowering the odds and increase or enlargement of the indication. A possible advantageous solution is the selection by the user for adding or multiplying in combination with a particular string also selected by the user for creating the highest probability of obtaining an indication outweighing or at least providing a favourable balance for the deducted amount from the bank account. The adding version may be labelled the mini version. The multiplying version may be labelled the maxi version.

In an embodiment of the string handler, the bank account access unit is a pin console. This provides an easy to implement embodiment.

In an embodiment of the string handler, the associating comprises associating the mark if also all preceding characters in the string are already associated with a mark. This embodiment applies an additional requirement of that all preceding characters in the string are already associated with a mark. Due to this order of applying marks to characters making up the string, the odds are lowered, which is typically balanced by an increase of the indication. This variation further advantageously adds to the playing options of the user and/or linking of multiple cycles or turns.

In an embodiment of the string handler, the set of characters comprises the group of letters a-z and/or the group of numbers 0-9. The set of characters comprising letters a-z allows for making strings of characters representing words. The set of characters comprising numbers allows for making strings of characters representing special numbers to the user, such as his birthday or -year. The combination of letters and numbers allows to form strings of characters comprising words or abbreviations in combination with special numbers to the user. Furthermore, the combination allows to replace words with a number, e.g. four with 4, and/or to replace characters in the words with a number, e.g. both with b0th or replace with r3place. This embodiment is typically advantageous in combination with the searchable database being one or more dictionaries and/or one or more Internet search engines as mentioned in other embodiments providing the additional challenge and/or playing option to the user to interact with the string handler. And additional advantage is that the combination of letters and numbers as characters is close to the roulette numbers of 0-36 allowing the string handler as game engine to be easier picked up by current players of the roulette game as well as casinos. In an embodiment, capital letters A-Z are used or supplement the character set.

In an embodiment of the string handler, the set of characters comprises a word character representing a word selected by the user, wherein the word is formed from at least three characters from the set of characters. The word character may be *, %, #or any other symbol typically not used as letter and number. The word character advantageously allows to put in the string a character that has the odds of a character, but represents a word, thus typically in combination with other words in the string advantageously forming a combination of words, such as a sentence in a shorter amount of characters influencing the odds typically in favour of the user. It is further noted that in case of a sentence, due to the limited number of characters in the set of characters, the sentence is typically not started with a capital and not ended with a point or dot. Instead of a full sentence, the string may comprise a sequence or combination of words, for example representing a sentence where non-essential words are left out, e.g. article words or helping verbs. Further, the word character in combination the letters and the numbers provide a set of characters of the same length as the European variant of the roulette game. Further, an additional word character may be added to match the amount of numbers in the American variant of the roulette game. An example of a string using the word character, relating to the previous example, may be "casino pays for our *", "casino * for our vacation", "casino pays * our vacation", "casino pays for * vacation", and "casino pays for our *".

In an embodiment of the string handler, the string handler comprises:

a user account database for storing a user status; and wherein the input device is also arranged for receiving an access code from a returning user; and wherein the controller is also configured for:

upon user instructions storing a user status and an access code associated with the user status in the user account database, wherein the user status comprises the string of characters and when present marks associated with characters of the string;

receiving the access code from the returning user; and when the access code in the user account database matches the received access code, loading from the user account database into the memory the string and when present marks associated with characters of the string. The database may advantageously be used in case the user would like to postpone the next round for a longer period of time. This may for example be the case when the string handler is part of a game played live in an establishment, such as a casino, which closes for the day. The user may then come back at another day continuing with the previous status. Thus, two cycles or turns may be separated by hours, days or even weeks or years, without the user losing his already gained marks associated with characters of a typically user selected string. The cycles or turns before and after the pause or separation in time may be called separate game sessions. Additionally, when the current string handler is not preferred anymore by the user, and multiple string handlers implemented in games are available, the user may select a to him more favourable string handler implemented in another game, such as selecting another playing table or screen. The game may be of the same type, but may also be of another type.

In an embodiment of the string handler, the random character generator comprises:

a roulette wheel comprising receiving spaces each associated with a unique character from the set of characters;

a ball receivable in each of the receiving spaces for selecting the random character associated with the receiving space;

a ball sensor arranged to the roulette wheel for sensing presence of the ball in a receiving space of the receiving spaces for determining the random character. This embodiment advantageously uses a roulette wheel as random character generator.

In an embodiment of the string handler, the random character generator comprises:

a dice, preferably having six faces numbered from 1 to 6; and an intelligent camera arranged for recognizing the number of the top face of the dice after been thrown; wherein the intelligent camera is arranged for combining two or more recognized numbers for generating the random character. This embodiment advantageously uses a dice as random character generator. To come to for example a single selection out of 36, 37, or 38 characters, the dice may be thrown multiple times. When the dice is thrown multiple times, the multiple throws should be combined in a predefined way, such that the user may preferably easily follow the random number selection by the dice. A possible option is to have two dices, one dice with four faces typically having a pyramid shape or tetrahedron shape with equal faces and ribs, and one dice with six surfaces typically having a cube shape. Alternatively, one dice that is thrown multiple times, whereafter multiple times are combined to a value in the range of 0-36.

According to a first aspect of the invention, a method for handling a string comprising:

retrieving from a memory a string of characters selected from the set of characters, wherein the string has a minimum length of three characters, and when present marks associated with each character of the string;

receiving at least one activation tag associated with at least one character of the string;

after receiving the at least one activation tag, generating a random character randomly selected from a set of characters;

after generating the random character, associating a mark with each character in the string if the character equals the random character, and if an activation tag was received for the character;

after associating and if all characters in the string are marked, providing an indication and resetting the string; and after the preceding step, storing in memory the string and when present one or more marks. The advantages of the method for handling a string are similar to the advantages mentioned for the string handler. In an embodiment of the method for a string handler, implemented in a computer advantageously allowing the user to use the string handler, such as when incorporated in a game, online.

According to a first aspect of the invention, a computer program product comprising a computer readable medium having computer readable code embodied therein, the computer readable code being configured such that, on execution by a suitable computer or processor, the computer or processor is caused to perform any of the methods of any of the embodiments mentioned.

BRIEF DESCRIPTION OF THE DRAWINGS

The invention will be apparent from and elucidated further with reference to the embodiments described by way of example in the following description and with reference to the accompanying drawings, in which.

The figures are purely diagrammatic and not drawn to scale. In the figures, elements which correspond to elements already described may have the same reference numerals.

LIST OF REFERENCE NUMERALS

| | |
|---|---|
| 100 | string handler |
| 110 | random character generator |
| 111 | roulette wheel |
| 112 | ball receivable |
| 113 | ball sensor |
| 114 | dice |
| 115 | intelligent camera |
| 116 | communicating random character |
| 120 | memory |
| 121 | communicating with memory |
| 126 | receiving from the input device at least one activation tag |
| 130 | input device |
| 131 | communicating activation tag |
| 140 | output device |
| 141 | communicating indications |
| 150 | controller |
| 160 | bank account access unit |
| 161 | communication with the bank account access unit |
| 170 | user account database |
| 171 | storing and retrieving user account |
| 200 | method for string handling |
| 201 | receiving the inputted string |
| 202 | verifying the inputted string |
| 203 | searching the string in a searchable database |
| 204 | storing the inputted string without any marks |
| 210 | retrieving from a memory a string of characters |
| 220 | receiving at least one activation tag |
| 230 | generating a random character |
| 240 | associating a mark |
| 241 | receiving the base value |
| 242 | calculating a to be deducted amount |
| 243 | providing the to be deducted amount |
| 250 | providing an indication and resetting the string |
| 260 | storing in memory the string and when present one or more marks |
| 270 | storing a user status and an access code |
| 271 | receiving the access code |
| 272 | loading the string and when present marks |
| 1000 | computer program product |
| 1010 | computer readable medium |
| 1020 | computer readable code |

DETAILED DESCRIPTION OF EXEMPLARY EMBODIMENTS

Figure 1:
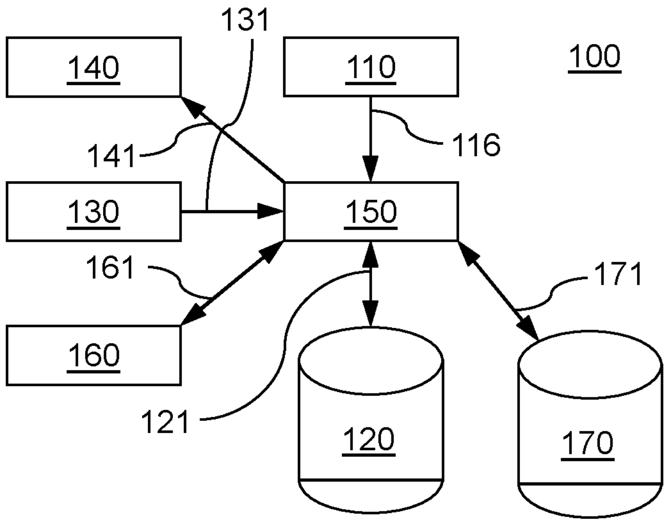
FIG. 1 schematically shows a string handler according to the invention.

The invention will be apparent from and elucidated further with reference to the embodiments described by way of example in the following description and with reference to the accompanying drawings, in which:

FIG. 1 schematically shows a string handler 100 according to the invention. The string handler comprises a random character generator 110, a memory 120, an input device 130, an output device 140, and a controller 150.

The random character generator generates a random character from a set of characters. Typically, the distribution of the chance a particular character is drawn is evenly distributed over all the characters of the set. The memory is arranged for storing a string of characters selected from the set of characters and marks associated with each character of the string. The string has a minimum length of three characters. In one embodiment the minimum string limit may be set to another value, such as two characters, without negatively influencing the technical effect of the current invention. The memory size may be selected such that relatively long strings together with the associated marks may be stored. A long string may be defined to comprise 256 characters, 128 characters, 64 characters, or as less as 32 characters. A character may comprise an ASCII character encoded in a byte or, a Unicode character encoded in e.g. 24 or 32 bits. In an alternative embodiment, the string may comprise space for storing 10 separate words of 10 characters each, separated by a carriage return, thus 110 characters in total. With reference to the section above, the carriage return may not be shown on the output device and/or may not be taken into consideration in the string handler as it may be considered as an entry separator. In an alternative implementation the string may comprise space for storing 10 separate words of 10 characters each shown on the output device as 10 rows below each other, while stored as one continuous string of 100 characters in total.

The input device may be a keyboard. The keyboard may be limited to only lower- or upper-case characters. The keyboard may comprise number characters. The keyboard may comprise additional symbols extending the alpha and/or numeric characters set. The output device may be a display or screen. In an alternative embodiment, the input and output device are combined with the use of a touch screen.

The controller may be implemented centralized, such as in a single microprocessor. The controller may be implemented decentralized, such as in multiple microprocessors, alternatively, the controller may be implemented with the use peripheral interfacing devices, such as FPGA's or ASIC's handling e.g. communication or pre-processing information.

The controller is configured for executing several steps. First, the controller retrieves 121 from the memory the string and when present the marks. Second, the controller receives 126 from the input device at least one activation tag. The first and the second step may be performed in reverse order or even in parallel. Third, after receiving the at least one activation tag, the controller receives 116 from the random character generator the random character. Thus, any random character generated and received as long as no activation tag is received is neglected. Typically, the first random character received after that the at least one activation is received is taken into account in the further steps of the controller. Fourth, after receiving the random character, the controller associates a mark with each character in the string if the character equals the random character, and if an activation tag was associated with the character in the string. Fifth, after associating and if all characters in the string are associated with a mark, the controller provides an indication to the output device and resets the string. Sixth, after the preceding step, the controller stores in memory the string and when present one or more marks.

Following from the steps above, the controller communicates 121 with the memory for retrieving and storing the string and when present the marks. Following from the steps above, the controller communicates 116 with the random character generator for receiving the random character. Following from the steps above, the controller communicates 131 with the input device for receiving the activation tag or tags. The input device may further communicate information inputted by a user to the controller for influencing the behaviour of the controller, the executing of steps and/or the information communicated by or displayed on the output device. Following from the steps above, the controller communicates 141 the indication from the controller to the output device. The output device may further receive and display the string of characters. The output device may further receive and display information relating to the string of characters and/or status of the string handler.

The random character may temporarily be stored in a character storage, which is typically a processor memory associated with or a register of a processor. Typically, in case of a processor memory a section of the processor memory is allocated for storing the random character. Additional information may be stored in the character storage, such counters and statistic information relating to the randomness of the random character generator. In certain embodiments the character storage is part of the memory.

The string handler may optimize the time the user may spend at the table or online. The string handler may further open a new set of playing options by applying the specified technical means.

Optionally, the string handler comprises a bank account access unit 160. The bank account access unit may communicate to a bank holding the bank account of the user. The user may receive instructions for accessing his bank account via the output device, and input the information via the input device. The bank account access and the input device and the output device may communicate via the controller or may communicate directly.

The controller at least performs the following steps before associating the mark. First, the controller receives the base value from the input device. The controller typically performs receiving the base value step before receiving the activation tag. Second, after receiving the activation tags, the controller calculates a to be deducted amount based on aggregation for each individual character in the string associated with a tag, based on the character value and the base value. The to be deducted amount for each individual character is typically based on the multiplication of the base value with the character value. Third, the controller provides the to be deducted amount to the bank account access unit. And typically, after the to be deducted amount is correctly deducted from the bank account, the controller performs the associating of marks step.

Following from the steps above, the controller communicates 161 with the bank account access unit the to be deducted amount and typically also receives balance information relating to the bank account of the user.

In an alternative implementation, the bank account access unit deducts an amount of the bank account of the user, such that the user has a local depot of money simplifying and relaxing the response requirements to the bank account access unit and more specifically the server of the bank with which the bank account access unit is communicating.

Optionally, the string handler comprises a user account database 170. The user account database may be located at a remote location and/or may be shared with other string handlers. In an alternative embodiment, the user account database may be merged with the memory 120. The user account database may store the current status of the string of characters. The status of the string may comprise the marks associated with characters of the string. The status may further comprise user playing history, such as statistics. The user account database may also store the access code or a derivative of the access code, such that the user may be verified when attempting to get access to the user account in the user account database.

The controller typically performs the following steps before the steps of retrieving from the memory the string and/or receiving from the input device at least one activation tag. The controller may perform the following steps at a later moment in time, such that the current status of the string handler, more specific the string of characters and when present the associated marks, are associated with the user account for updating the user account. First, the controller stores a user status and an access code associated with the user status in the user account database upon user instructions. The user instructions are typically inputted with the use of the input device and the user is typically guided by output shown on the output device. Second at a later moment in time, the controller receives the access code from the returning user. Third, when the access code in the user account database matches the received access code, the controller loads from the user account database into the memory the string and when present marks associated with characters of the string. Hereafter the controller typically continues with the step of retrieving from the memory the string and when present the marks and/or receiving from the input device at least one activation tag.

Following from the steps above, the controller communicates 171 with the user account database for storing and retrieving one or more user accounts.

The string handler may comprise a searchable database of strings, or an interface to a searchable database of strings. The searchable database may comprise strings which are allowed or validated for use with the string handler. The strings in the searchable database are typically composed of characters which are within the set of characters used by the string handler, more typically all characters of the set of characters are used in all the strings in the searchable database.

The controller typically performs the following steps before the steps of retrieving from the memory the string and/or receiving from the input device at least one activation tag. First, the controller receives the inputted string from the character input device. The user is typically guided by the output device in inputting the string into the input device. Second, the controller verifies that the inputted string comprises at least three characters. Third, the controller searches the string in a searchable database of strings, and if found providing a found indicator. The second and third step may be performed in parallel or in reverse order. Fourth, if a found indicator is provided, the controller stores the inputted string without any marks in the memory. The preceding steps allow the string handler to get configured to start the game or play.

Figure 2:
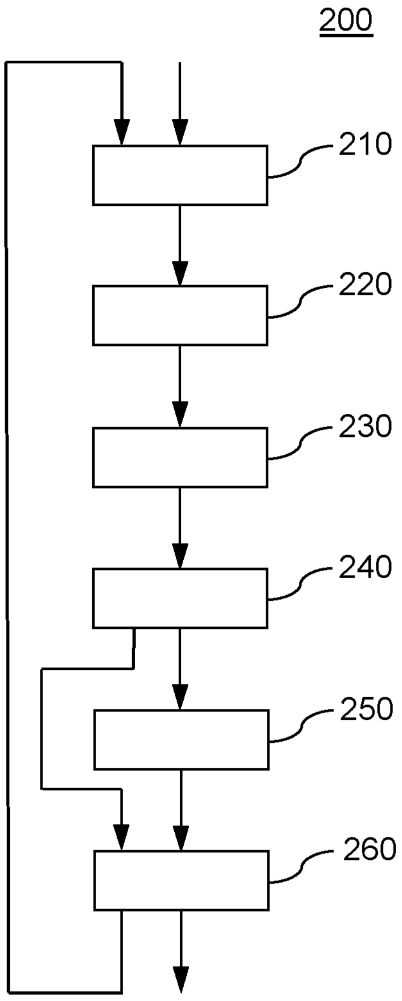
FIG. 2 schematically shows a method for handling a string according to the invention.

FIG. 2 schematically shows a method 200 for handling a string according to the invention. Method for handling a string comprises several steps as specified below. The method starts with retrieving 210 from a memory a string of characters selected from the set of characters, wherein the string has a minimum length of three characters, and when present marks associated with each character of the string. The string and marks are typically retrieved from memory local or external. The method continues with receiving 220 at least one activation tag associated with at least one character of the string. The step of receiving may be done parallel or ahead of the step of retrieving string and marks from memory. Typically, the provides information to a user inputting the one or more activation tags. The retrieving step may retrieve this information from a remote location where the user is located towards a system executing the method. After receiving the activation tags, the method continues with the step of generating 230 a random character from a set of characters. The random character is typically generated by a random character generator. After generating the random character, the method continues with associating 240 a mark with each character in the string if the character equals the random character, and if an activation tag was received for the character. After associating if and all characters in the string are marked, the method continues with providing 250 an indication and resetting the string. As the step of providing an indication is conditionally executed, the following step may also directly follow the step of associating a mark, if the condition of the current step is not fulfilled. After the preceding step, the method continues with storing 260 in memory the string and when present one or more marks. If the preceding step of providing an indication is executed, the current step of storing in memory becomes optional. Further, after executing the current step, the method may continue with step of retrieving from a memory the string and if present the marks. Effectively starting another playing round. The storing and retrieving may be local to a controller executing the method, e.g. in internal memory or even cache memory, alternatively, the storing and retrieving be done in relation to more remote memory, such as swap memory, hard disc, or remotely located database or server. Further, after executing the current step, the method may end the execution of steps according to the invention thus effectively ceasing handling of the current string.

Figure 3:
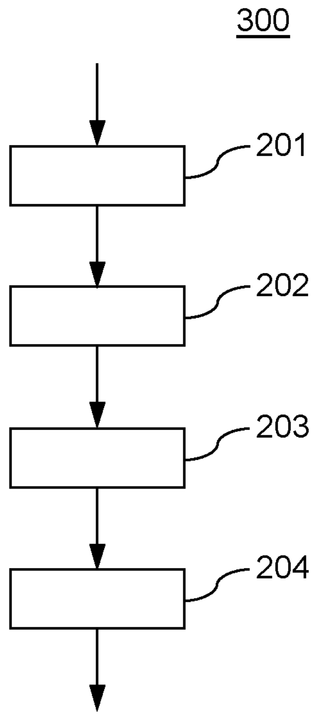
FIG. 3 schematically shows a method for searching for string as part of the method for handling a string.

FIG. 3 schematically shows an optional method 300 for searching for a string as part of the method 200 for handling a string. The optional method starts with receiving 201 an inputted string typically from the character input device. The inputting of the string is typically supported by information shown to the user for example via an output device. The optional method continues with verifying 202 that the inputted string comprises at least three characters. This minimum advantageously allows the number of cycles that the method or phrased differently the number of game cycles to be such that the standard deviation is limited to a level such that the chance that a game, which can be defined as starting with a string without marks and ending when an indication is provided that all characters in the string have a mark associated, is below a minimum number of game cycles is greatly reduced. The minimum number of game cycles is at least three as the minimum number of characters is three. In variants of the current invention, the minimum string length may be set to other values, such as 2, 4, 5 or 6 to influence the minimum of game cycles and/or maximum standard deviation. The optional method continues with searching 203 the string in a searchable database of strings, and if found providing a found indicator. The optional method, if a found indicator is provided, continues with storing 204 the inputted string without any marks in the memory.

Figure 4:
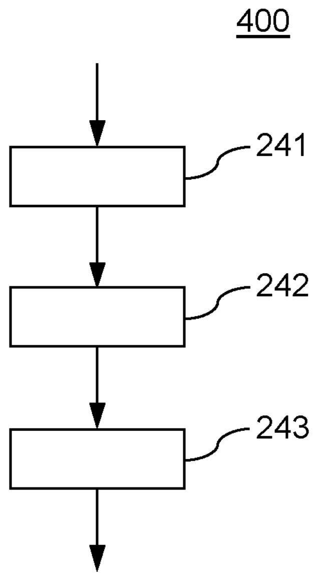
FIG. 4 schematically shows a method for coupling a bank account as part of the method for handling a string.

FIG. 4 schematically shows an optional method 400 for coupling a bank account as part of the method for handling a string. The optional method starts with receiving 241 the base value from the input device. The optional method, after receiving the activation tags, continues with calculating 242 a to be deducted amount based on aggregation for each individual character in the string associated with a tag, based on the character value and the base value. The optional method continues with providing 243 the to be deducted amount to the bank account access unit. The optional method may be part of the method for handling a string as previously specified or as specified for the controller for the string handler.

Figure 5:
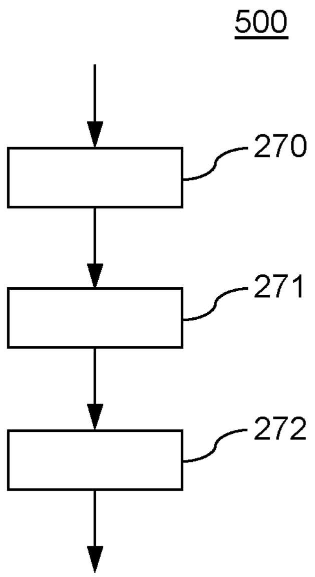
FIG. 5 schematically shows a method for coupling a user account as part of the method for handling a string.

FIG. 5 schematically shows a method for coupling a user account as part of the method for handling a string. The optional method starts with storing 270 a user status and an access code associated with the user status in the user account database upon user instructions. The user status may comprise the string of characters and when present marks associated with characters of the string. The optional method continues with receiving 271 the access code from the returning user. The optional method, when the access code in the user account database matches the received access code, continues with loading from the user account database into the memory the string and when present marks associated with characters of the string. The optional method may be part of the method for handling a string as previously specified or as specified for the controller for the string handler.

Figure 6:
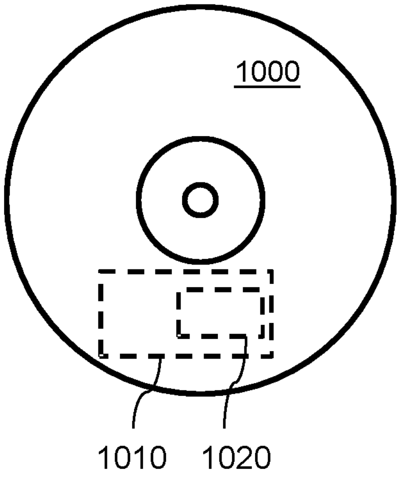
FIG. 6 schematically shows an embodiment of a computer program product, computer readable medium and/or non-transitory computer readable storage medium according to the invention.

FIG. 6 schematically shows an embodiment of a computer program product 1000, computer readable medium 1010 and/or non-transitory computer readable storage medium according to the invention comprising computer readable code 1020.

It will also be clear that the above description and drawings are included to illustrate some embodiments of the invention, and not to limit the scope of protection. Starting from this disclosure, many more embodiments will be evident to a skilled person without departing from the scope of the invention as set forth in the appended claims. These embodiments are within the scope of protection and the essence of this invention and are obvious combinations of prior art techniques and the disclosure of this patent. Devices functionally forming separate devices may be integrated in a single physical device.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Thus, these terms are not necessarily intended to indicate temporal or other prioritization of such elements.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and "to include", and its conjugations does not exclude the presence of elements or steps other than those stated in a claim. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The article "a" or "an" preceding an element does not exclude the presence of a plurality of such elements.

The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

It will be appreciated that the invention also applies to computer programs, particularly computer programs on or in a carrier, adapted to put the invention into practice. The program may be in the form of a source code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

The various aspects discussed in this patent can be combined in order to provide additional advantages. The mere fact that certain measures are recited in mutually different claims does not indicate that a combination of these measures cannot be used to advantage. Furthermore, some of the features can form the basis for one or more divisional applications.

The invention claimed is:

1. A string handler comprising:

a random character generator for generating a random character randomly selected from a set of characters;

a memory arranged for storing a string of characters selected from the set of characters, wherein the string has a minimum length of three characters, and marks associated with each character of the string;

an input device for inputting at least one activation tag associated with at least one character of the string;

an output device for conveying an indication to a user;

a controller configured for:

retrieving from the memory the string and when present the marks;

receiving from the input device at least one activation tag;

after receiving the at least one activation tag, receiving from the random character generator the random character;

after receiving the random character, associating a mark with each character in the string if the character equals the random character, and if an activation tag was associated with the character in the string;

after associating and if all characters in the string are associated with a mark, providing an indication to the output device and resetting the string; and after the preceding step, storing in memory the string and when present one or more marks.

2. The string handler according to claim 1, wherein the input device is also arranged for inputting the string, and wherein the controller is also configured for:

receiving the inputted string from the input device;

verifying that the inputted string comprises at least three characters;

searching the string in a searchable database of strings, and if found providing a found indicator; and if a found indicator is provided, storing the inputted string without any marks in the memory.

3. The string handler according to claim 2, wherein the searchable database is based on a dictionary of at least one particular language.

4. The string handler according to claim 3, wherein the searchable database is accessible through an Internet search engine.

5. The string handler according to claim 4, further comprising:

a bank account access unit for deducting amounts from a bank account of the user; and wherein the output device is also configured for showing a to be deducted amount from the bank account;

wherein the input device is also configured for inputting a base value;

wherein the memory is also arranged for storing a character value for each character of the set of characters based on a frequency analysis of the characters forming strings in the searchable database; and wherein the controller is also configured for:

receiving the base value from the input device;

after receiving the activation tags, calculating a to be deducted amount based on aggregation for each individual character in the string associated with an activation tag, based on the character value and the base value; and providing the to be deducted amount to the bank account access unit.

6. The string handler according to claim 5, wherein the aggregation is based on multiplying the character value with the base value for each character, whereafter these values per character are added or multiplied.

7. The string handler according to claim 5, wherein the bank account access unit is a pin console.

8. The string handler according to claim 5, wherein the associating comprises associating the mark if also all preceding characters in the string are already associated with a mark.

9. The string handler according to claim 5, wherein the set of characters comprises a group of letters from a to z or a group of numbers from 0 to 9.

10. The string handler according to claim 1, wherein the set of characters comprises a word character representing a word selected by the user, wherein the word is formed from at least three characters from the set of characters.

11. The string handler according to claim 1, further comprising:

a user account database for storing a user status; and wherein the input device is also arranged for receiving an access code from a returning user; and wherein the controller is also configured for:

upon user instructions storing a user status and an access code associated with the user status in the user account database, wherein the user status comprises the string of characters and when present marks associated with characters of the string;

receiving the access code from the returning user; and when the access code in the user account database matches the received access code, loading from the user account database into the memory the string and when present marks associated with characters of the string.

12. The string handler according to claim 1, wherein the random character generator comprises:

a roulette wheel comprising receiving spaces each associated with a unique character from the set of characters;

a ball receivable in each of the receiving spaces for selecting the random character associated with the receiving space;

a ball sensor arranged to the roulette wheel for sensing presence of the ball in a receiving space of the receiving spaces for determining the random character.

13. The string handler according to claim 1, wherein the random character generator comprises:

a dice having six faces numbered from 1 to 6; and an intelligent camera arranged for recognizing the number of the top face of the dice after been thrown; wherein the intelligent camera is arranged for combining two or more recognized numbers for generating the random character.

14. A method for handling a string comprising:

retrieving from a memory a string of characters selected from the set of characters, wherein the string has a minimum length of three characters, and when present marks associated with each character of the string;

receiving at least one activation tag associated with at least one character of the string;

after the step of receiving the at least on activation tag, generating a random character randomly selected from a set of characters;

after the step of generating the random character, associating a mark with each character in the string if the character equals the random character, and if an activation tag was received for the character, after the step of associating and if all characters in the string are marked, providing an indication and resetting the string; and after the step of providing, storing in memory the string and when present one or more marks.

15. The method according to claim 14, wherein the method is implemented in a computer.

16. A computer program product comprising:

a computer readable medium having a computer-readable code stored thereon, the computer readable code being configured such that when executed by a processor, the processor is configured to:

retrieve from a memory a string of characters selected from the set of characters, wherein the string has a minimum length of three characters, and when present marks associated with each character of the string;

receive at least one activation tag associated with at least one character of the string;

after the step of receiving the at least on activation tag, generate a random character randomly selected from a set of characters;

after the step of generating the random character, associate a mark with each character in the string if the character equals the random character, and if an activation tag was received for the character;

after the step of associating and if all characters in the string are marked, provide an indication and resetting the string; and after the step of providing, storing in memory the string and when present one or more marks.

* * * * *